L. G. HURD.
HATPIN FASTENER.
APPLICATION FILED APR. 29, 1919.
1,365,591.
Patented Jan. 11, 1921.
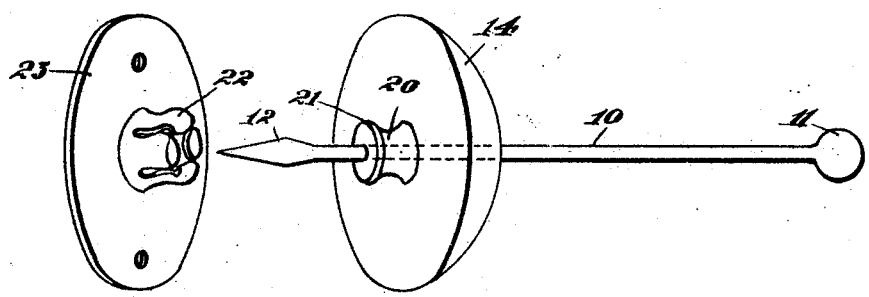
INVENTOR.
LEIGH G. HURD
BY
ATTORNEY.

UNITED STATES PATENT OFFICE.

LEIGH G. HURD, OF LOS ANGELES, CALIFORNIA.

HATPIN-FASTENER.

1,365,591. Specification of Letters Patent. Patented Jan. 11, 1921.

Application filed April 29, 1919. Serial No. 293,531.

*To all whom it may concern:*

Be it known that I, LEIGH G. HURD, a citizen of the United States, residing at Los Angeles, in the county of Los Angeles and State of California, have invented new and useful Improvements in Hatpin-Fasteners, of which the following is a specification.

My invention relates to a hat-pin fastener, and particularly to a hat-pin fastener that can be attached to the ordinary hat-pins in common use so as not to make necessary the use of hat-pins of special construction.

Another object is to provide a hat-pin fastener that will prevent the loss or theft of the hat-pin, when same is attached to the hat.

A further object of my invention is to provide a hat-pin fastener that can be cheaply manufactured, and that is simple in construction.

Other objects will appear hereinafter.

The invention is illustrated in the drawing in which:

The figure is a perspective view illustrating the preferred form of my invention. Referring to the drawing more specifically, 10 indicates the shank of an ordinary hat-pin with a head 11 attached to same, the pointed end of the hat-pin having a flattened and broadened end 12 adjacent to the point. A snap or glove fastener composed of two parts 14 and 23, is intended to slidably support the hat-pin shank 10 when attached to the wall of a hat, the flattened and broadened end 12 preventing the complete withdrawal of the hat-pin as shown in the drawing.

The body member 14 shown in the drawing is formed with a hub 20 having a flanged end 21, and is intended to fit into the snap or glove fastener 22 formed on a member 23. An opening or orifice extends through the center of the member 14 and hub 20 the entire length. This opening or orifice is of such a diameter that the hat-pin shank 10 will be slidably supported in same, said hat-pin shank 10 being inserted through the opening in the center of the body member 14 and hub 20 previous to having the end 12 flattened and broadened.

The member 23 formed with a snap or glove fastener 22 has an opening or orifice through the center of same, of such a diameter that the flattened and broadened end 12 will easily pass therethrough.

In the operation of my invention an ordinary hat-pin is thrust through the opening in the member 14 and the hub 20 in the position shown in the drawing. The end 12 of the hat-pin is now slightly flattened and broadened which prevents the withdrawal of the hat-pin, the flattened end 12 and the head 11 preventing the complete withdrawal of the pin which is slidably supported in the member 14 and hub 20.

The flattened and broadened end 12 of the hat-pin is now inserted through the opening in the center of the snap or glove fastener 22 and the member 23, and the members 14 and 23 are snapped together, the snap or glove fastener 22 engaging the flanged end 21.

In attaching this device and a hat-pin to a hat, the member 23 is positioned on the inside of the hat with the snap or glove fastener 22 protruding through the wall of the hat. A hat-pin with a member 14 attached as previously described is now inserted in the central opening in the member 23, and the members 23 and 14 snapped together, which will prevent the hat-pin falling out of the hat. A hat-pin equipped with this device is used the same as any other. In attaching a hat-pin equipped with this device to a hat the hub 20 can be inserted through the wall of the hat instead of the snap or glove fastener 22 if so desired, as the same result will be obtained regardless of which method is used.

It can readily be seen that my device can be easily attached to the ordinary hat-pins in common use, making hat-pins of special construction unnecessary.

Having thus described my invention, what I claim is:

1. A hat-pin fastener consisting of two members, one of the members formed with a hub having a flanged end, and an orifice extending through the center of the member and hub the entire length, of such a diameter as to slidably and movably support and fit a hat-pin shank when attached to a hat, and a second member equipped with a spring snap for engaging the flanged end on the before-mentioned hub, and an orifice extending through the center of the second member of such a diameter that an enlarged or flattened end of a hat-pin can pass therethrough.

2. A hat-pin fastener comprising the combination of an ordinary hat-pin with an enlarged and flattened end, and a member formed with a hub having a flanged end, and an orifice extending through the center of the member and hub the entire length, of such a diameter as to slidably and movably support and fit the hat-pin shank when permanently attached to a hat, and a second member equipped with a spring snap for engaging the flanged end on the before mentioned hub, and an orifice extending through the center of the second member of such a diameter that the enlarged and flattened end of the hat-pin can pass therethrough.

3. A hat-pin fastener comprising the combination of a hat-pin formed with an enlarged and flattened end adjacent to the point, and a member formed with a hub having a flanged end, and an orifice extending through the center of the hub and member the entire length, of such a diameter as to slidably and movably support the hat-pin shank when the complete device and a hat-pin are permanently attached to a hat, the free movement of the hat-pin being allowed between the head and the flattened and broadened end of same when in this position, and a second member adapted to engage the flanged end of the before mentioned hub, and an orifice extending through the center of the second member of such a diameter that the enlarged and flattened end of the hat-pin can pass therethrough.

In testimony whereof I have signed my name to this specification.

LEIGH G. HURD.

It is hereby certified that in Letters Patent No. 1,365,591, granted January 11, 1921, upon the application of Leigh G. Hurd, of Los Angeles, California, for an improvement in "Hatpin-Fasteners," an error appears in the printed specification requiring correction as follows: Page 2, after line 32, insert the following as claim 4:

*4. A hat-pin fastener consisting of two members, one of the members formed with a hub having a flanged end, and a second member adapted to engage the flanged end of the hub of the first member, and an orifice extending through the center of one of the members the entire length, of such a diameter as to slidably and movably support and fit a hat-pin shank when attached to a hat, and an orifice extending through the center of the other member of such a diameter that an enlarged or flattened end of a hat-pin can pass therethrough.;* and that the said Letters Patent should be read with this correction therein that the same may conform to the record of the case in the Patent Office.

Signed and sealed this 8th day of March, A. D., 1921.

[SEAL.]

M. H. COULSTON,
*Commissioner of Patents.*

Cl. 132—25.